United States Patent
Ino

(10) Patent No.: US 7,755,723 B2
(45) Date of Patent: Jul. 13, 2010

(54) LIQUID CRYSTAL DISPLAY DEVICE AND DISPLAY APPARATUS

(75) Inventor: Masumitsu Ino, Kanagawa (JP)

(73) Assignee: Sony Corporation, Tokyo (JP)

(*) Notice: Subject to any disclaimer, the term of this patent is extended or adjusted under 35 U.S.C. 154(b) by 94 days.

(21) Appl. No.: 11/948,318

(22) Filed: Nov. 30, 2007

(65) Prior Publication Data

US 2008/0151156 A1  Jun. 26, 2008

(30) Foreign Application Priority Data

Dec. 25, 2006  (JP)  ............................. 2006-347048

(51) Int. Cl.
*G02F 1/1335* (2006.01)
*G02F 1/1333* (2006.01)
*G02F 1/1343* (2006.01)

(52) U.S. Cl. .................. 349/114; 349/138; 349/141

(58) Field of Classification Search ......... 349/113–115, 349/138, 141, 143
See application file for complete search history.

(56) References Cited

U.S. PATENT DOCUMENTS

2008/0002079 A1* 1/2008 Kimura ................. 349/42

FOREIGN PATENT DOCUMENTS

| JP | 2001-042336 | 2/2001 |
|---|---|---|
| JP | 2002-229032 | 8/2002 |
| JP | 2003-344837 | 12/2003 |
| JP | 2005-106967 | 4/2005 |
| JP | 2005-524115 | 11/2005 |
| JP | 2005-338256 | 12/2005 |
| JP | 2005-338264 | 12/2005 |
| JP | 2006-071977 | 3/2006 |
| JP | 2007-240752 | 9/2007 |
| JP | 2007-322941 | 12/2007 |
| JP | 2008-107526 | 5/2008 |
| JP | 2008-145525 | 6/2008 |

OTHER PUBLICATIONS

A Japanese Office Action dated Oct. 28, 2008 issued in connection with counterpart Japanese Patent Application No. 2006-347048.

* cited by examiner

*Primary Examiner*—Andrew Schechter
*Assistant Examiner*—Michael Inadomi
(74) *Attorney, Agent, or Firm*—Sonnenschein Nath & Rosenthal LLP

(57) ABSTRACT

A liquid crystal display device includes: a liquid crystal layer sandwiched between a first substrate and a second substrate; and a reflective display area on the first substrate side, the reflective display area being provided with a common electrode and a pixel electrode having a plurality of slits so as to apply an electric field to the liquid crystal layer, wherein between the first substrate and the pixel electrode, a reflective film and an interlayer insulating film, both films having projecting patterns on a front surface side, are arranged in this order from the first substrate side, and the pixel electrode and the common electrode are arranged so that electric field intensities between the pixel electrode and the common electrode are made equal in the reflective display area.

5 Claims, 16 Drawing Sheets

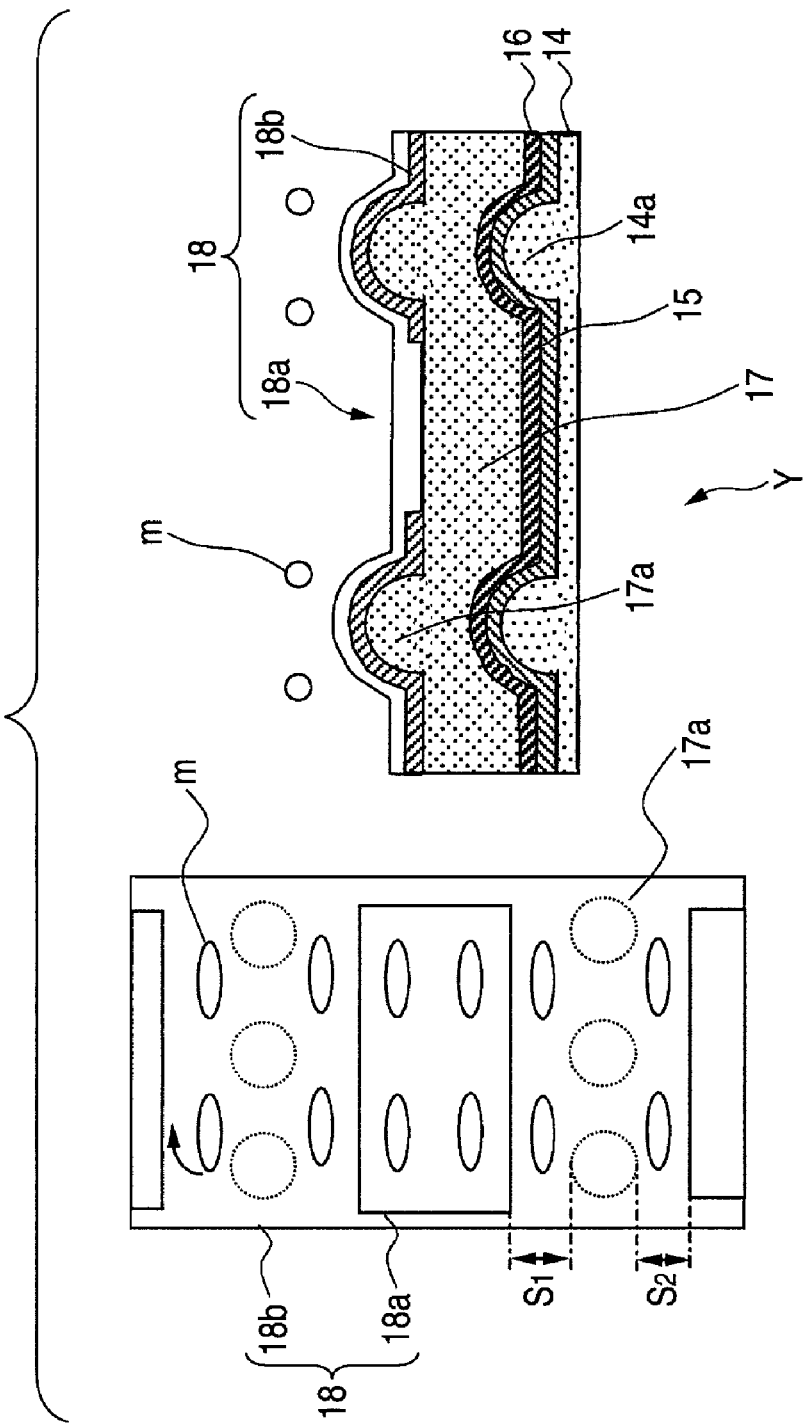

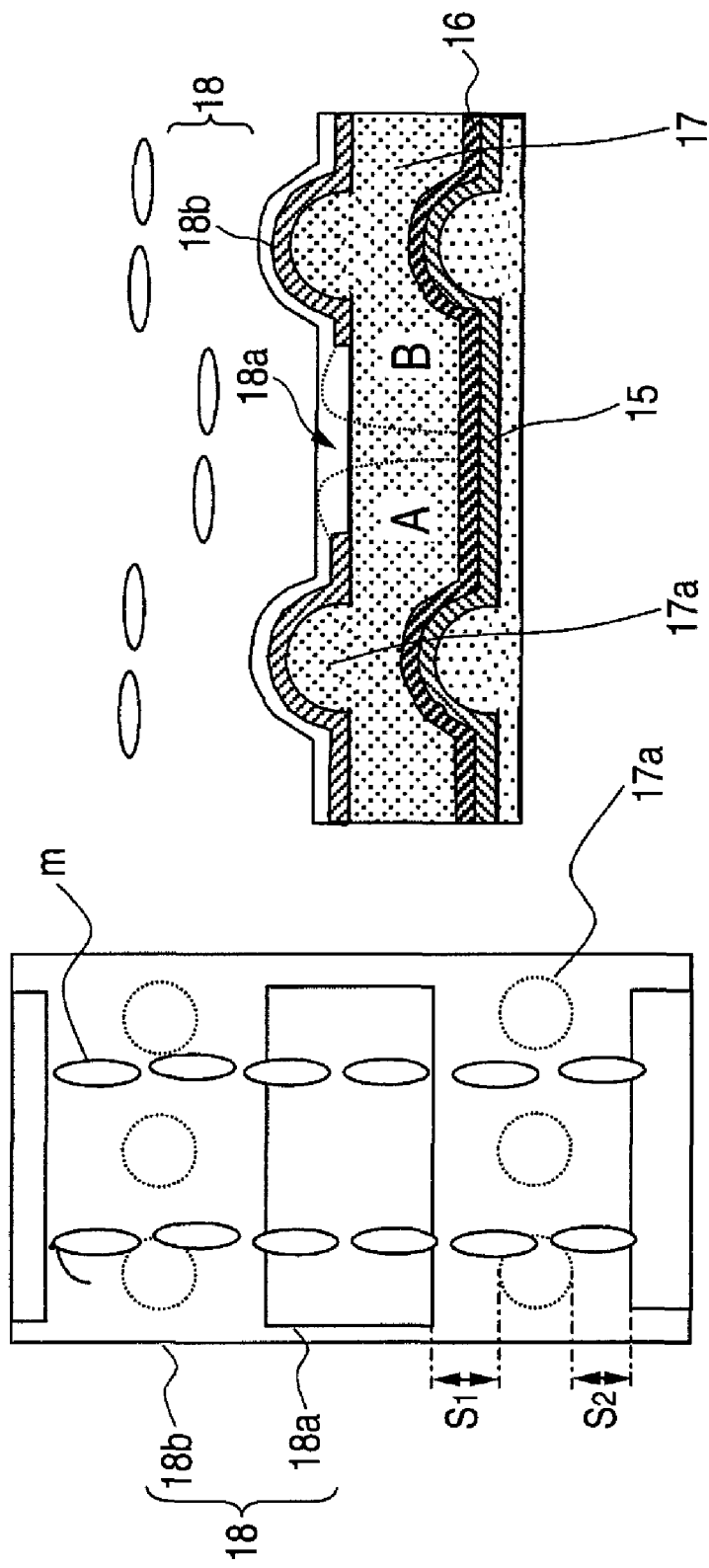
FIG. 3B WHEN AN ELECTRIC FIELD APPLIED

FIG. 6 WHEN AN ELECTRIC FIELD APPLIED

WHEN AN ELECTRIC FIELD APPLIED

LIQUID CRYSTAL DISPLAY DEVICE AND DISPLAY APPARATUS

CROSS REFERENCES TO RELATED APPLICATIONS

The present invention contains subject matter related to Japanese Patent Application JP 2006-347048 filed in the Japanese Patent Office on Dec. 25, 2006, the entire contents of which being incorporated herein by reference.

BACKGROUND OF THE INVENTION

1. Field of the Invention

The present invention relates to a liquid crystal display device and a display apparatus, particularly to a Fringe Field Switching (FFS) mode or In-Plane Switching (IPS) mode liquid crystal display device and a display apparatus having the same.

2. Description of the Related Art

In the FFS mode or IPS mode liquid crystal display device, pixel electrodes and a common electrode are provided on the same substrate side, in which a lateral electric field almost in parallel to the substrate surface is formed and the lateral electric field drives a liquid crystal device to display images. For example, in the FFS mode liquid crystal display device, such an example is described in which a common electrode is arranged in a plate form or comb tooth form on a substrate and pixel electrodes having a slit are arranged on the common electrode (for example, see Patent Reference 1 (JP-A-2001-42336) and Patent Reference 2 (JP-A-2002-229032)).

On the other hand, in recent years, for a liquid crystal display device for use in mobile appliances, a transreflective liquid crystal display device is disclosed in which the dark state and the visibility under ambient light are improved in the IPS mode (for example, see Patent Reference 3 (JP-A-2005-338256), Patent Reference 4 (JP-A-2005-338264), Patent Reference 5 (JP-T-2005-524115) and Patent Reference 6 (JP-A-2006-71977)). In these liquid crystal display devices, since no scattering film is provided in the reflective display area, the reflection efficiency of light from the ambient light is low, and the viewing angle is narrow in the reflective mode.

Then, in the transreflective liquid crystal display device, a FFS mode or IPS mode liquid crystal display device is considered that has a scattering film with projecting patterns on the front surface side in the reflective display area. A prior art FFS mode liquid crystal display device is described with reference to FIG. 11.

The liquid crystal display device shown in the drawing is a transreflective liquid crystal display device 1 having a transmissive display area X and a reflective display area Y in a single pixel. The liquid crystal display device 1 has a liquid crystal panel formed of a first substrate 10, a second substrate 20 that is provided on the device forming surface side of the first substrate 10 as facing thereto, and a liquid crystal layer 30 sandwiched between the first substrate 10 and the second substrate 20. In addition, in the liquid crystal panel, polarizers 40 and 50 are bonded to the outer surfaces of the first substrate 10 and the second substrate 20, and on the outer side of the polarizer 40 on the first substrate 10 side, a backlight (not shown) to be a light source for transmissive display is provided.

Among them, the first substrate 10 is formed of a transparent substrate such as a glass substrate, and a thin film transistor (TFT) 1 is provided on the surface facing the liquid crystal layer 30. On this surface, a common line 11 is extended in parallel to a gate line 2 configuring the TFT 1. They are covered with a first interlayer insulating film 13.

Then, on the first interlayer insulating film 13 in the reflective display area Y, a scattering film 14' is provided that is formed of an insulating film and has projecting patterns 14a' on the front surface side for scattering the light incident from the second substrate 20 side. The projecting patterns 14a' are arranged randomly.

In addition, on the scattering film 14' and the first interlayer insulating film 13, a common electrode 15' is provided that is formed of a transparent electrode on the area except the top of the drain electrode 12b, and the common electrode 15' is connected to the common line 11. Moreover, on the common electrode 15' on the scattering film 14' in the reflective display area Y, a reflective film 16' is provided. Then, on the first interlayer insulating film 13, a second interlayer insulating film 17' is provided as it covers the common electrode 15' and the reflective film 16'. Here, the common electrode 15', the reflective film 16' and the second interlayer insulating film 17' formed on the scattering film 14' are formed to have projecting patterns as similar to the surface topology of the scattering film 14'.

On the second interlayer insulating film 17', a pixel electrode 18' is provided that has a plurality of slits 18a' connected to the drain electrode 12b of the TFT 1. Then, an electric field is generated between the end parts of the electrode part arranged as the slit 18a' is sandwiched and the common electrode 15', whereby a lateral electric field almost in parallel to the substrate surface is applied to the liquid crystal layer 30.

On the other hand, the second substrate 20 is formed of a transparent substrate such as a glass substrate, and on the surface of the second substrate 20 facing the liquid crystal layer 30, R (red), G (green), and B (blue) color filters 21 and an alignment layer 22 are provided in this order. In addition, on the surface of the alignment layer 22 facing the liquid crystal layer 30 in the transmissive display area X, a non-phase difference layer 23 is provided, and on the surface of the alignment layer 22 facing the liquid crystal layer 30 in the reflective display area Y, a phase difference layer 24 and a flattened layer 25 are provided in this order. Then, on the surfaces of the non-phase difference layer 23 and the flattened layer 25 facing the liquid crystal layer 30, an alignment layer 26 is provided.

SUMMARY OF THE INVENTION

However, in the liquid crystal display device described above, as shown in FIG. 12, since the projecting patterns 14a' provided on the surface of the scattering film 14' are arranged randomly, variations occur in the distances between the common electrode 15' and the end parts of the electrode part as sandwiching the slit 18a' of the pixel electrode 18' arranged on the second interlayer insulating film 17' formed as similar to the surface topology. Therefore, the electric field intensities depicted by electric power lines between the end parts and the common electrode 15' when an electric field is applied is B>A, and drive voltage is fluctuated. At this time, since the drive voltage is defined with reference to a weaker electric field intensity, the average drive voltage becomes higher.

In addition, as described above, because variations occur in the distances between the common electrode 15' and the end parts of the electrode part as sandwiching the slit 18a' of the pixel electrode 18', it is difficult to apply an electric field in the lateral direction almost in parallel to the substrate surface when the electric field is applied, and it is hard to conduct orientation control over the liquid crystal molecules m.

Therefore, the light transmittance of the liquid crystal layer is decreased, and the contrast is dropped.

Then, it is desirable to provide a liquid crystal display device which reduces drive voltage and improves contrast and a display apparatus having the same.

A liquid crystal display device according to an embodiment of the invention is a liquid crystal display device including: a liquid crystal layer sandwiched between a first substrate and a second substrate; and a reflective display area on the first substrate side, the reflective display area being provided with a common electrode and a pixel electrode having a plurality of slits so as to apply an electric field to the liquid crystal layer, wherein between the first substrate and the pixel electrode, a reflective film and an interlayer insulating film, both films having projecting patterns on a front surface side, are arranged in this order from the first substrate side, and the pixel electrode and the common electrode are arranged so that electric field intensities between the pixel electrode and the common electrode are made equal in the reflective display area.

In addition, a liquid crystal display apparatus according to an embodiment of the invention includes a liquid crystal display device having: a liquid crystal layer sandwiched between a first substrate and a second substrate; and a reflective display area on the first substrate side, the reflective display area being provided with a common electrode and a pixel electrode having a plurality of slits so as to apply an electric field to the liquid crystal layer, in which light modulated by the liquid crystal display device is used to display video, wherein between the first substrate and the pixel electrode, a reflective film and an interlayer insulating film, both films having projecting patterns on a front surface side, are arranged in this order from the first substrate side, and the pixel electrode and the common electrode are arranged so that electric field intensities between the pixel electrode and the common electrode are made equal in the reflective display area.

According to the liquid crystal display device and the liquid crystal display apparatus, the pixel electrode and the common electrode are arranged so that electric field intensities between the pixel electrode and the common electrode are made equal in the reflective display area, whereby fluctuations in the electric field intensity are suppressed when the same voltage is applied. Thus, the average drive voltage can be reduced. In addition, the electric field intensities are matched in the reflective display area, whereby the electric field intensity in the lateral direction in parallel to the substrate surface can be increased with respect to the liquid crystal layer. Therefore, when an electric field is applied, liquid crystal molecules are suppressed from being oriented as tilting to the substrate surface. Accordingly, since the light transmittance of the liquid crystal layer is enhanced, the contrast can be improved.

As discussed above, in accordance with the liquid crystal display device and the liquid crystal display apparatus according to an embodiment of the invention, since the drive voltage is decreased as well as the contrast is improved, higher efficiency and higher image quality can be intended in a liquid crystal display device.

BRIEF DESCRIPTION OF THE DRAWINGS

FIGS. 3A and 3B shows a cross section depicting the essential part of the configuration of the liquid crystal display device according to the first embodiment of an embodiment of the invention;

DESCRIPTION OF THE PREFERRED EMBODIMENTS

Hereinafter, embodiments of the invention will be described in detail.

1. First Embodiment

Figure 1A:
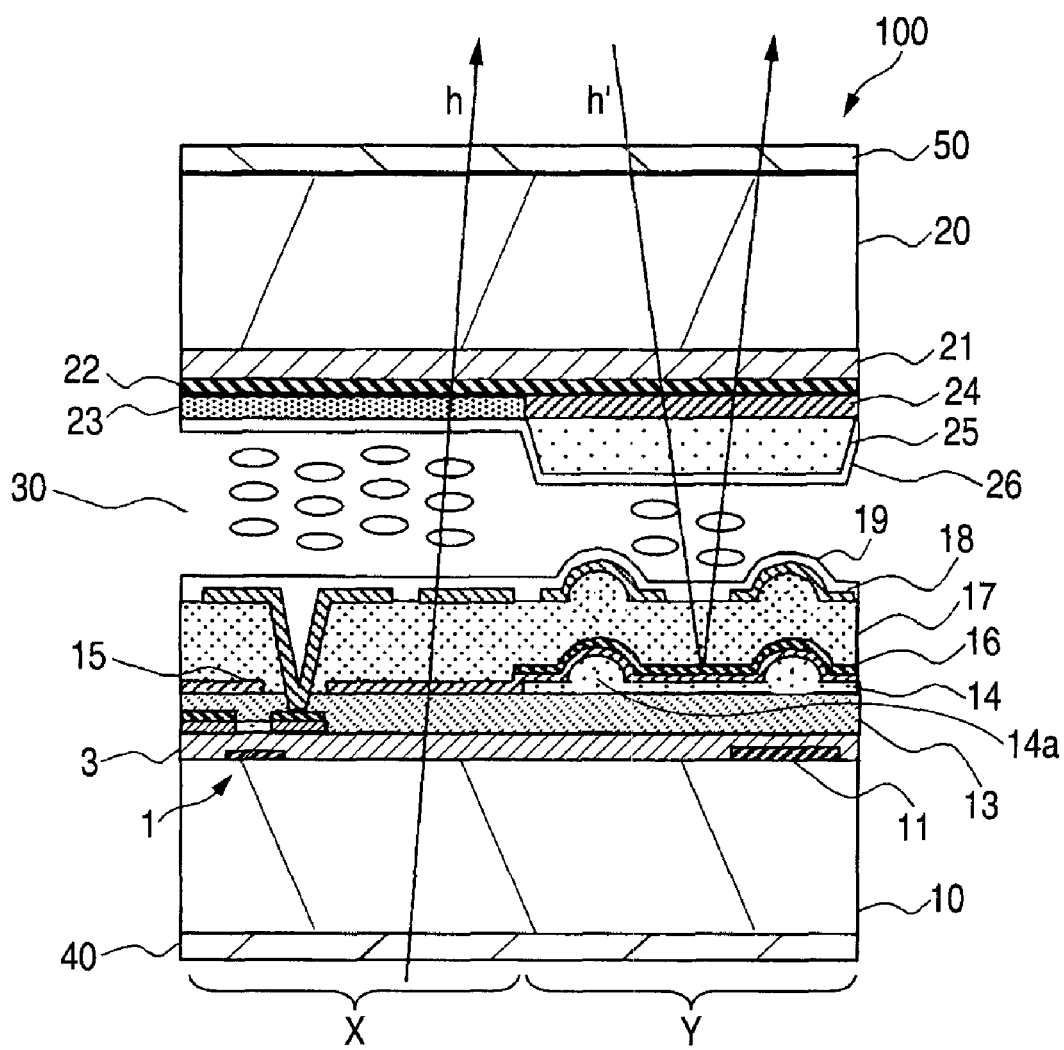
FIG. 1A shows a cross section depicting the configuration of a liquid crystal display device according to a first embodiment of an embodiment of the invention and FIG. 1B shows a plan view depicting the same.
Figure 1B:
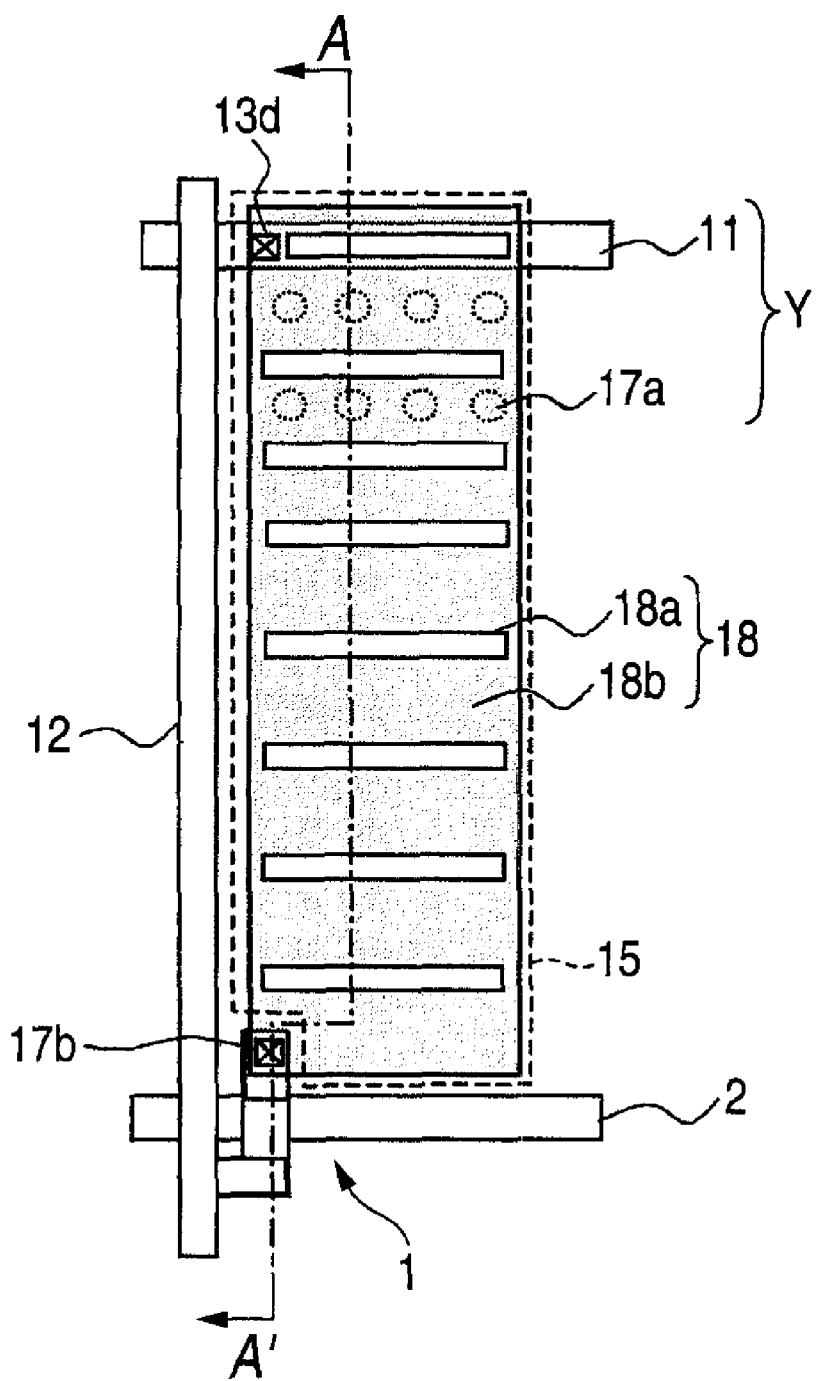

FIG. 1A shows a cross section depicting a liquid crystal display device according to a first embodiment, and FIG. 1B shows a plan view. Moreover, FIG. 1A shows A-A' cross section in FIG. 1B. A liquid crystal display device 100 shown in these drawings is a transreflective liquid crystal display device 1 having a transmissive display area X and a reflective display area Y in a single pixel, and the device 100 is configured as a FFS mode display device as shown below.

More specifically, the liquid crystal display device 100 has a liquid crystal panel formed of a first substrate 10, a second substrate 20 that is provided on the device forming surface side of the first substrate 10 as facing thereto, and a liquid crystal layer 30 sandwiched between the first substrate 10 and the second substrate 20. Here, it is supposed that the liquid crystal layer 30 is configured of nematic liquid crystal molecules. In addition, in the liquid crystal panel, on the outer surfaces of the first substrate 10 and the second substrate 20, the polarizers 40 and 50 are bonded to the substrates, respectively, through an adhesive (not shown). It is supposed that the polarizers 40 and 50 are provided in crossed nicols. In addition, on the outer side of the polarizer 40 on the first substrate 10 side, a backlight (not shown) is provided that is a light source for transmissive display.

In the configuration above, the configuration except the first substrate 10 is a general configuration. For example, the second substrate 20 that is a display side substrate is formed of a transparent substrate such as a glass substrate, on the surface of the second substrate 20 facing the liquid crystal layer 30, R (red), G (green), B (blue) color filters 21 and an alignment layer 22 are provided in this order.

On the surface of the alignment layer 22 facing the liquid crystal layer 30 in the transmissive display area X, a non-phase difference layer 23 is provided, and on the surface of the alignment layer 22 facing the liquid crystal layer 30 in the reflective display area Y, a phase difference layer 24 and a flattened layer 25 are provided in this order. The phase difference layer 24 functions as a λ/4 layer. In addition, the flattened layer 25 controls the cell gap in the reflective display area Y to be one half of the cell gap in the transmissive display area. Then, on the surfaces of the non-phase difference layer 25 and the flattened layer 24 facing the liquid crystal layer 30, an alignment layer 26 is provided.

On the other hand, since the first substrate 10 that is a back side substrate has the characteristic configuration of an embodiment of the invention, it will be described in detail below. The first substrate 10 is formed of a transparent substrate such as a glass substrate, and a TFT 1 is provided on the front surface facing the liquid crystal layer 30.

Figure 2:
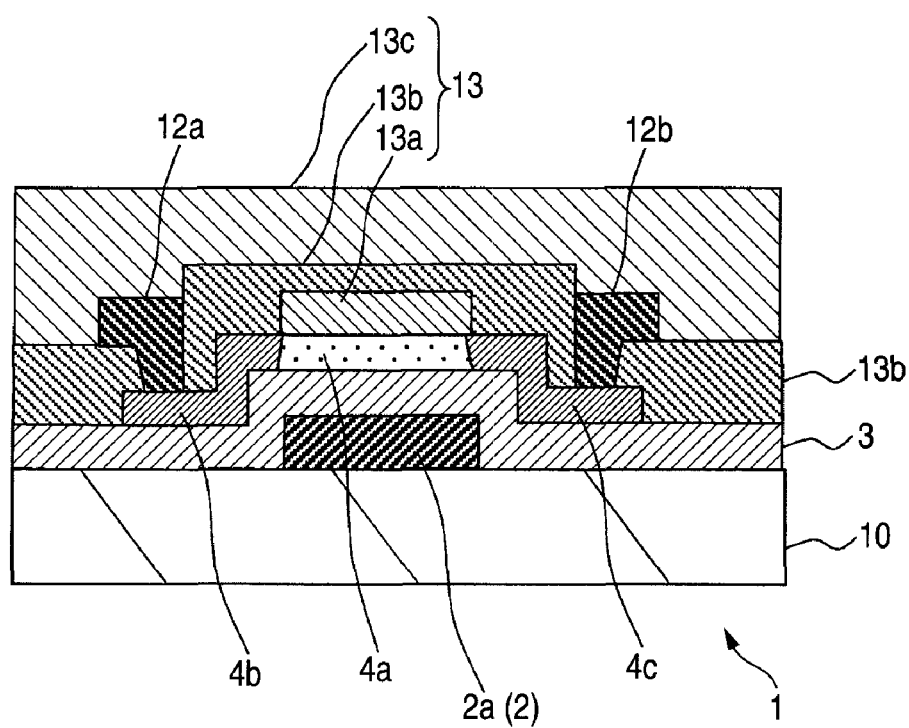
FIG. 2 shows a cross section depicting a thin film transistor of the liquid crystal display device according to the first embodiment of an embodiment of the invention.

Here, FIG. 2 shows the configuration of the TFT 1. For example, in the case in which the TFT is a bottom gate TFT, a gate line 2 is provided on the first substrate 10, which is extended in one direction and partially functions as a gate electrode 2a. In addition, on the first substrate 10, a gate insulating film 3 is provided as it covers the gate line 2, and on the gate insulating film 3, a semiconductor layer 4 is formed in a pattern.

Here, for example, the semiconductor layer 4 is configured of amorphous silicon, polysilicon or silicon single crystal, in which the area above the gate electrode 2a is a channel layer 4a, and a source region 4b and a drain region 4c containing an n-type impurity, for example, are provided on both sides thereof. The source region 4b and the drain region 4c are formed by ion injection in which an insulating layer 13a provided above the channel layer 4a is used as a mask. Then, on the gate insulating film 3, an insulating layer 13b is provided as it covers the semiconductor layer 4 and the insulating layer 13a, and a source electrode 12a and a drain electrode 12b are connected to the source region 4b and the drain region 4c through a contact hole provided on the insulating layer 13b. In addition, a signal line 12 is extended in one direction as it communicates with the source electrode 12a, and the line 12 is arranged orthogonal to the gate line 2. Moreover, on the insulating layer 13b, an insulating layer 13c is provided as it covers the signal line 12 and the drain electrode 12b. As described above, the first interlayer insulating film 13 formed of the insulating layers 13a, 13b and 13c covers the thin film transistor 1.

Then, again referring to FIGS. 1A and 1B, on the front surface of the first substrate 10 provided with the thin film transistor 1 facing the liquid crystal layer 30, a common line (Vcom line) 11 is extended in parallel to the gate line 2. Accordingly, the gate insulating film 3 is provided on the first substrate 10 as it covers the gate line 2 and the common line 11.

In addition, on the first interlayer insulating film 13, a scattering film 14 is provided that is formed of an insulating film of an acrylic resin, for example, and has projecting patterns 14a on the front surface side in the reflective display area Y. The projecting patterns 14a are formed by typical photolithography technique. Then, on the scattering film 14 and the first interlayer insulating film 13, a common electrode 15 formed of a transparent electrode such as ITO (Indium Tin Oxide) is provided in the area except above the drain electrode 12b. The common electrode 15 is connected to the common line 11 through a contact hole 13d, shown only in FIG. 1B.

Moreover, a reflective film 16 is provided on the common electrode 15 on the scattering film 14 in the reflective display area Y, and on the first interlayer insulating film 13, a second interlayer insulating film 17 is provided as it covers the common electrode 15 and the reflective film 16. Here, the common electrode 15, the reflective film 16 and the second interlayer insulating film 17 formed on the scattering film 14 are formed to have projecting patterns as similar to the surface topology of the scattering film 14. Here, the projecting patterns formed on the front surface of the second interlayer insulating film 17 are projecting patterns 17a.

Moreover, here, the example is described in which the scattering film 14 having the projecting patterns 14a on the front surface side is provided below the reflective film 16, but an embodiment of the invention is not restricted thereto, and it is sufficient that the projecting patterns are provided on the front surface side of the reflective film 16. For example, the reflective film 16 itself may have projecting patterns on the front surface side, or projecting patterns may be provided in the area arranged in the reflective display area Y of the common electrode 15. In this case, the projecting patterns can be formed by typical lithography technique.

In the second interlayer insulating film 17 and the first interlayer insulating film 13, a contact hole 17b reaching the drain electrode 12b is provided, and a pixel electrode 18 having a plurality of slits 18a is provided as it is connected to the drain electrode through the contact hole 17b. For example, the plurality of the slits 18a is provided almost in parallel to the gate line 2. In addition, on the second interlayer insulating film 17, an alignment layer 19 is provided as it covers the pixel electrode 18.

Here, FIGS. 3A and 3B show an enlarged diagram depicting the essential part of the reflective display area Y. FIG. 3A shows a diagram when no electric field is applied, and FIG. 3B shows a diagram when an electric field is applied. Here, when no electric field is applied, as shown in FIG. 3A, the liquid crystal molecules m are aligned horizontally almost in parallel to the slit 18a.

The characteristic configuration of an embodiment of the invention is in that the pixel electrode 18 and the common electrode 15 are arranged so that the electric field intensities between the pixel electrode 18 and the common electrode 15 become equal in the reflective display area Y. In the embodiment, the projecting patterns 17a of the second interlayer insulating film 17 provided similar to the projecting patterns 14a of the scattering film 14 are lined up along the longitudinal direction of the slit 18a, for example, directly under the electrode part 18b of the pixel electrode 18. In other words, the electrode part 18b of the pixel electrode 18 is provided as it covers the projecting patterns 17a. The end part of the electrode part 18b is to be provided on the flat surface of the second interlayer insulating film 17. Thus, the distances between the end parts of the electrode part 18b through the slit 18a and the front surface of the common electrode 15, that is, the front surface of the reflective film 16 become equal.

Here, the distances between the end parts of the electrode part 18b and the common electrode 15, that is, the film thickness of the second interlayer insulating film 17 defines drive voltage, and in the FFS mode reflective liquid crystal display device, it is known that Equation (1) below is held. Therefore, the distances between the end parts of the electrode part 18*b* and the common electrode 15 become equal, whereby fluctuations in electric field intensities A and B can be suppressed when an electric field is applied shown in FIG. 3B, and drive voltage can be reduced. Accordingly, an electric field is applied in the lateral direction almost in parallel to the substrate surface with respect to the liquid crystal layer 30, that is, in the width direction of the slit 18*a*, and the liquid crystal molecules m are rotated at an angle of 90 degrees.

$$Vlcd = \pi \cdot L/D\sqrt{(K/\in lcd)} \quad \text{Equation (1)}$$

Vlcd: the drive voltage of the liquid crystal molecule

L: the film thickness of the second interlayer insulating film

D: liquid crystal molecule gap

K: viscosity constant of the liquid crystal molecule

∈lcd: the dielectric constant of the liquid crystal molecule

In addition, in this case, since the projecting patterns 14*a* of the scattering film 14 are not provided under the slit 18*a*, an electric field is generated between the end parts of the electrode part 18*b* of the pixel electrode 18 and the flat surface of the common electrode 15. Therefore, since the electric field intensity in the reflective display area Y is defined with no influence of the projecting patterns 14*a*, the electric field intensity in the transmissive display area X can be matched with that in the reflective display area Y.

Here, it is supposed that a plurality of the slits 18*a* and the electrode part 18*b* between the slits 18*a* provided in the pixel electrode 18 are provided to have a width of 3 μm to 7 μm, and the diameter of the projecting pattern 17*a* is provided in 2 μm to 6 μm, the diameter smaller than the width of the electrode part 18*b* so that the projecting patterns 17*a* are surely covered with the electrode part 18*b*.

In addition, preferably, distances $S_1$ and $S_2$ of end portions of the slits between the end part of the projecting patterns 17*a* of the second interlayer insulating film 17 and both end parts or edges of the electrode part 18*b* of the pixel electrode 18, that is, the width of the flat area of the electrode part 18*b* is equal to or greater than the length of the major axis of the liquid crystal molecule m. Accordingly, when no electric field is applied, the liquid crystal molecules m are prevented from being oriented as tilting to the substrate surface, and a luminance increase can be prevented when light is blocked. In addition, the width of the flat area of the electrode part 18*b* is equal to or greater than the length of the major axis of the liquid crystal molecule m, whereby the liquid crystal molecules m are not hampered from being horizontally aligned on the electrode part 18*b* to be the base point of alignment when an electric field is applied. Thus, a contrast decrease and the occurrence of disclination can be prevented.

As described above, the FFS mode transreflective liquid crystal display device in the embodiment is configured. Moreover, here, the projecting patterns 17*a* of the second interlayer insulating film 17, that is, the projecting patterns 14*a* of the scattering film 14 are lined up, but an embodiment of the invention is not restricted thereto, and the projecting patterns may be arranged in a plurality of rows.

Next, again referring to FIGS. 1A and 1B, the operation of the liquid crystal display device will be described. When no electric field is applied, the liquid crystal molecules m in the liquid crystal layer 30 are oriented so as not to have phase differences. Thus, in the transmissive display area X, a light h from the backlight having passed through the polarizer 40 is absorbed in the polarizer 50 arranged in crossed nicols to the polarizer 40, and then the light is blocked. In addition, in the reflective display area Y, an ambient light h' incident from the polarizer 50 side travels around the λ/4 phase difference layer 24 to generate a phase difference of λ/2, and the ambient light h' becomes linear polarized light with an angle of 90 degrees rotated. Thus, the light is absorbed in the polarizer 50, and the light is blocked.

On the other hand, when an electric field is applied, in the transmissive display area X, the liquid crystal molecules m are oriented so that a light transmits through the liquid crystal layer 30 to generate a phase difference of λ/2. Therefore, a light h from the backlight having passed through the polarizer 40 transmits through the liquid crystal layer 30 to generate a phase difference of λ/2, and the light h becomes linear polarized light with an angle 90 degrees rotated. Thus, the light passes through the polarizer 50, and the light is transmitted. In addition, in the reflective display area Y, since the cell gap is controlled to be ½ of that in the transmissive display area X, the liquid crystal molecules m are oriented so that a light passes through the liquid crystal layer 30 to generate a phase difference of λ/4. Therefore, an ambient light h' incident from the polarizer 50 side travels around the λ/4 phase difference layer 25 and the liquid crystal layer 30 to generate a phase difference of λ, and the ambient light h' becomes linear polarized light with an angle of 180 degrees rotated. Thus, the light passes through the polarizer 50, and the light is transmitted.

Figure 4:
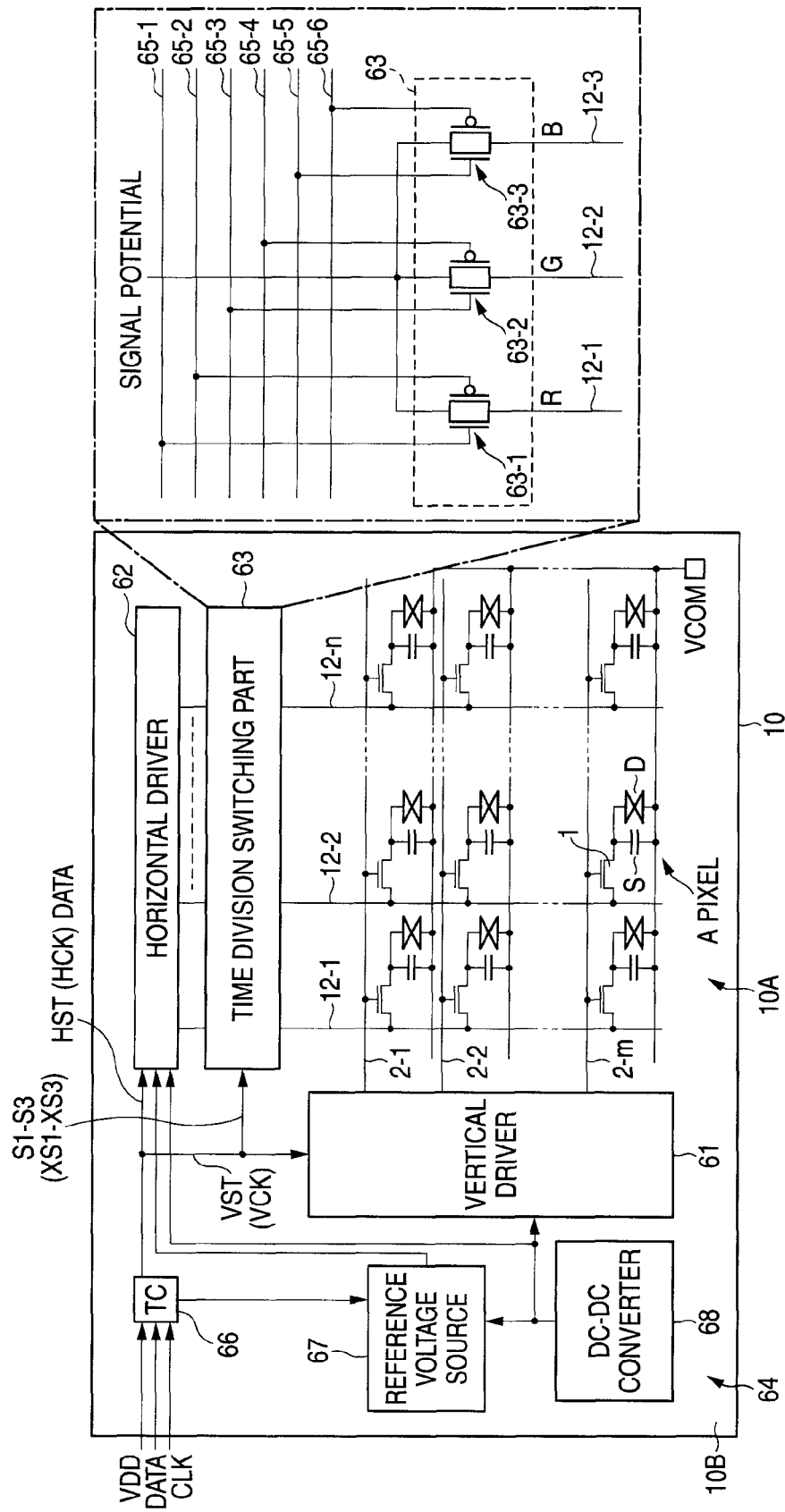
FIG. 4 shows a block diagram depicting the circuit pattern of the liquid crystal display device according to the first embodiment of an embodiment of the invention.

Next, FIG. 4 shows a circuit diagram depicting the liquid crystal display device 100. On the first substrate 10 of the liquid crystal display device 100, a display area 10A and its peripheral area 10B are formed. In the display area 10A, a plurality of the gate lines 2 and a plurality of the signal lines 12 are wired vertically and laterally, and the area 10A is configured as a pixel array part in which a single pixel A is provided corresponding to each of the intersecting parts.

In addition, the peripheral area 10B is mounted with a vertical driver 61 that in turn selects each of the pixels A in the display area 10A in units of rows, a horizontal driver 62 that writes pixel signals to each of the pixels A selected in units of rows, a time division switching part 63 for time division drive, and a control system 64 that controls vertical and horizontal drivers 61 and 62 and a time division switching part 63.

Each of the pixels A comprises a TFT 1 having a gate electrode connected to gate lines 2-1 to 2-*m* and a source electrode 12*a* connected to signal lines 12-1 to 12-*n*, a display device D having the pixel electrode 18 connected to the drain electrode 12*b* of the TFT 1, and an auxiliary capacitance S having one electrode connected to the drain electrode 12*b* of the TFT 1. In each of the pixels A thus configured, the common electrode of the display device D is connected to the common line 11 together with the other electrode of the auxiliary capacitance S. To the common line 11, a predetermined direct current voltage or a square voltage in synchronization with horizontal synchronizing signal is supplied as a common voltage VCOM.

Here, the liquid crystal display device 100 is driven in accordance with time division drive. Time division drive is a drive method in which a plurality of the signal lines 12 adjacent to each other in the display area 10A is split as a single unit (block), a signal voltage to be supplied to a plurality of the signal lines 12 in the unit block is outputted from each of the output terminals of the horizontal driver 62 in a time series, whereas the time division switching part 63 is provided in a unit of a plurality of the signal lines 12, and the time division switching part 63 samples the signal voltage outputted from the horizontal driver 62 in time division in a time series, and in turn supplies the voltage to a plurality of the signal lines.

The time division switching part 63 is configured of an analog switch (transmission switch) that samples a signal voltage in a time series outputted from the horizontal driver 62 in time division. A specific exemplary configuration of the time division switching part 63 is shown. In addition, the time division switching part 63 is provided one each for each of the outputs of the horizontal driver 62. Moreover, here, an example is shown in which three time division drive is conducted as corresponding to the R (red), G (green), and B (blue) filters.

The time division switching part 63 is configured of CMOS analog switches 63-1, 63-2 and 63-3 in which a P-channel MOS transistor and an N-channel MOS transistor are connected to each other in parallel. Moreover, in this example, CMOS analog switches are used for the analog switches 63-1, 63-2 and 63-3, but PMOS or NMOS analog switches may be used.

In the time division switching part 63, each of the input ends of three analog switches 63-1, 63-2 and 63-3 are connected to each other in common, and each of the output ends is connected to each of one ends of three signal lines 12-1, 12-2 and 12-3. Then, to each of the input ends of the analog switches 63-1, 63-2 and 63-3, the signal potential outputted from the horizontal driver 62 in a time series is supplied.

In addition, six control lines 65-1 to 65-6 in total are wired to the analog switches, two each for a single analog switch. Then, two control input ends of the analog switch 63-1 (that is, the gates of the CMOS transistor) are connected to the control lines 65-1 and 65-2, two control input ends of the analog switch 63-2 are connected to the control lines 65-3 and 65-4, and two control input ends of the analog switch 63-3 are connected to the control lines 65-5 and 65-6.

To the six control lines 65-1 to 65-6, gate selection signals S1 to S3 and XS1 to XS3 are supplied from a timing controller (TC) 66, described later, the gate selection signals S1 to S3 and XS1 to XS3 that in turn select the three analog switches 63-1, 63-2 and 63-3. However, the gate selection signals XS1 to XS3 are the inverted signals of the gate selection signals S1 to S3.

The gate selection signals S1 to S3 and XS1 to XS3 sequentially turn on the three analog switches 63-1, 63-2 and 63-3 in synchronization with the signal potential outputted from the horizontal driver 62 in a time series. Thus, the analog switches 63-1, 63-2 and 63-3 supply the signal potential outputted from the horizontal driver 62 in a time series to the corresponding signal lines 12-1, 12-2 and 12-3 while the switches sample the signal potential in three time division for one hour.

The control system 64 that controls the vertical driver 61, the horizontal driver 62 and the time division switching part 63 has the timing controller (TC) 66, a reference voltage source 67 and a DC-DC converter 68, configured in which these circuits are mounted on the peripheral area 10B of the first substrate together with the vertical driver 61, the horizontal driver 62 and the time division switching part 63.

In the control system 64, for example, the timing controller 66 is inputted with a power supply voltage VDD from an external power supply part (not shown), digital image data data from an external CPU (not shown), and a clock CLK from an external clock generator (not shown) through a TCP (not shown).

According to the liquid crystal display device and the liquid crystal display apparatus having the same, the second interlayer insulating film 17 is formed to have the projecting pattern 17a as similar to the surface topology of the scattering film 14 provided with the projecting patterns 14a on the front surface side, and the electrode part 18b of the pixel electrode 18 is provided as it covers the projecting patterns 17a. Thus, the electric field intensities between the common electrode 15 and the end parts of the electrode part 18b as the slit 18a is sandwiched become equal in the reflective display area Y. Accordingly, since fluctuations in the electric field intensity are suppressed when the same voltage is applied, the average drive voltage can be reduced, and a highly efficient liquid crystal display device can be intended.

In addition, the electric field intensities are matched in the reflective display area Y, whereby the electric field intensity of the lateral electric field in the width direction of the slit 18a can be increased with respect to the liquid crystal layer 30. Thus, when an electric field is applied, the liquid crystal molecules m can be prevented from being oriented as tilting to the substrate surface. Therefore, since the light transmittance of the liquid crystal layer 30 is improved, the contrast can be improved.

Moreover, in accordance with the liquid crystal display device according to the embodiment, since the electric field intensities in the transmissive display area X and the reflective display area Y can be matched with each other, fluctuations in the electric field intensity in the pixel can be suppressed to allow a further reduction in drive voltage.

In addition, the distances $S_1$ and $S_2$ between the end part of the projecting patterns 17a of the second interlayer insulating film 17 and both end parts of the electrode part 18b of the pixel electrode 18 are made equal to or greater than the length of the major axis of the liquid crystal molecule m, whereby a contrast decrease and the occurrence of disclination can be prevented.

Figure 5:
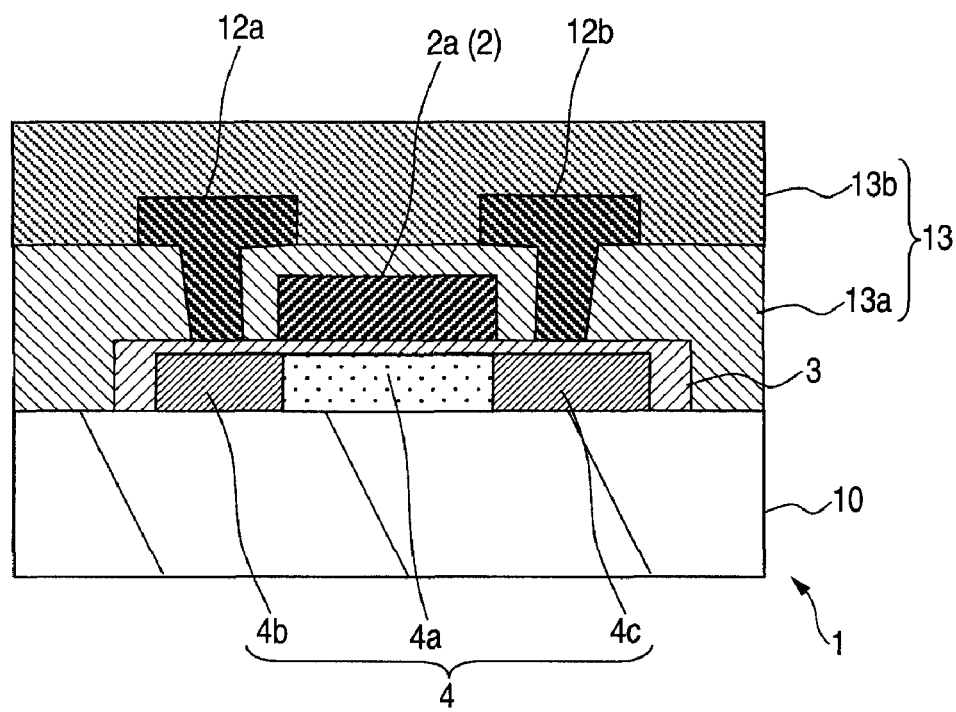
FIG. 5 shows a cross section depicting another exemplary thin film transistor of the liquid crystal display device according to the first embodiment of an embodiment of the invention.

Moreover, in the embodiment, the example is described in which the TFT 1 is a bottom gate transistor, but the TFT 1 may be a top the gate transistor. In this case, as shown in FIG. 5, a semiconductor layer 4 formed of a-Si, Poly-Si or crystal-Si is formed in a pattern on a first substrate 10, and on the semiconductor layer 4, a gate line 2 is formed in a pattern that is extended in one direction and partially functions as a gate electrode 2a through a gate insulating film 3. In this case, since the gate electrode 2a is used as a mask to ion inject an n-type impurity, the semiconductor layer 4 directly under the gate electrode 2a becomes a channel layer 4a, and the semiconductor layer 4 on both sides thereof becomes a source region 4b and a drain region 4c. In addition, on the gate line 2 and the gate insulating film 3, an insulating layer 13a is provided, and the source and drain regions 4b and 4c and source and drain electrodes 12a and 12b are connected to each other through contact holes provided on the insulating layer 13a. Moreover, an insulating layer 13b is provided on the insulating layer 13a as it covers the source and drain electrodes 12a and 12b. As described above, the first interlayer insulating film 13 formed of the insulating layers 13a and 13b covers the thin film transistor 1.

2. Modification 1

Figure 6:
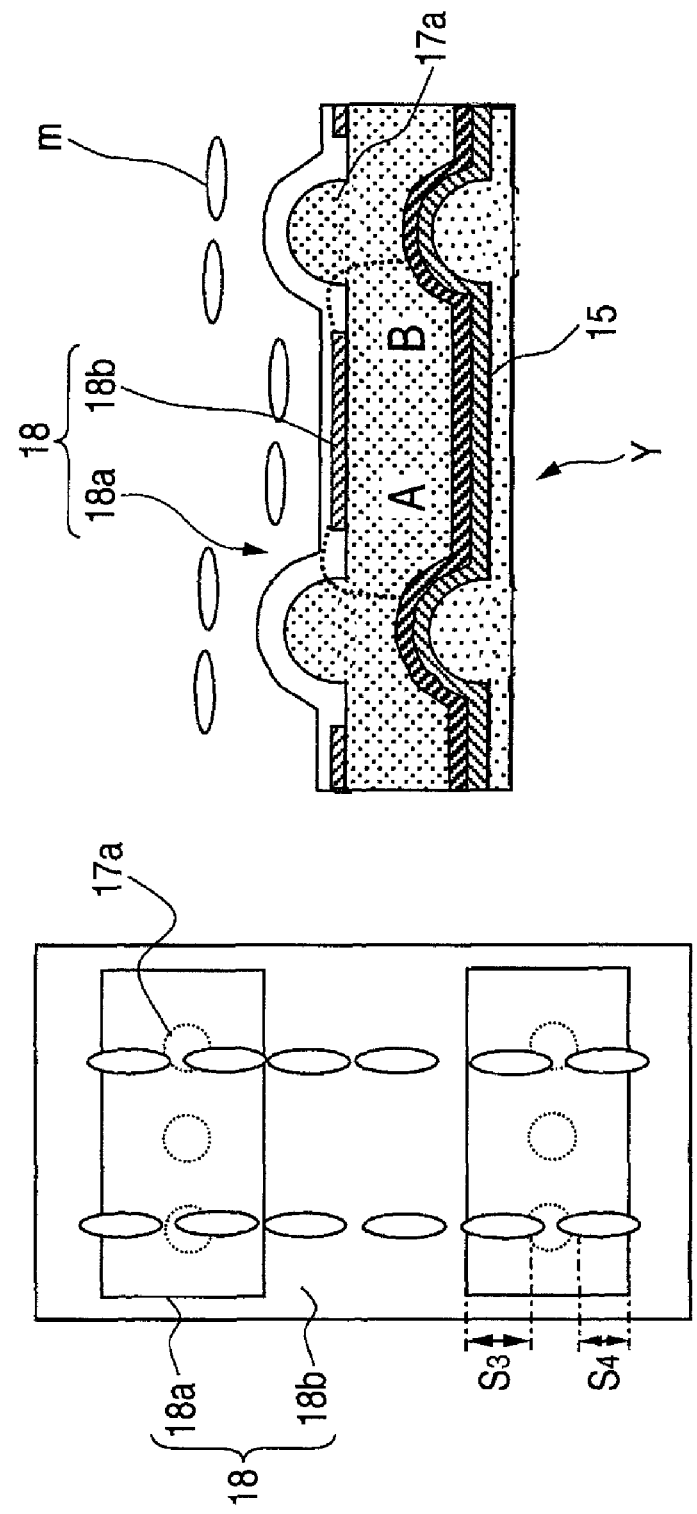
FIG. 6 shows a cross section depicting the essential part of a liquid crystal display device according to a modification 1 of the first embodiment of an embodiment of the invention.

In addition, in the first embodiment described above, the example is described in which the electrode part 18b of the pixel electrode 18 covers the projecting patterns 17a of the second interlayer insulating film 17, but an embodiment of the invention is not restricted thereto. As shown in an enlarged diagram depicting the essential part of a reflective display area Y (when an electric field is applied) in FIG. 6, the pixel electrode 18 may be provided so that the projecting patterns 17a are arranged in the slit 18a.

In this case, since the projecting patterns 14a of the scattering film 14 are arranged below the slit 18a, an electric field is generated between the end part of the electrode part 18b of the pixel electrode 18 and the projecting patterns on the common electrode 15. Thus, the distances between the end parts of the electrode part 18b and the common electrode 15 become short, the electric field intensity is increased, and orientation control over the liquid crystal molecules m is made easier. However, in this case, in order to equal the electric field intensities between the end parts of the electrode part 18b of the pixel electrode 18 and the common electrode 15, preferably, the electrode parts 18b of the pixel electrode 18 are arranged so that distances $S_3$ and $S_4$ between the end part of the projecting pattern 17a and the end parts of the electrode part 18b become equal.

Even in the liquid crystal display device configured in this manner, as similar to the first embodiment, since variations in the distances between the end parts of the electrode part 18b and the common electrode 15 in the reflective display area Y are suppressed, drive voltage can be reduced as well as the contrast can be improved.

3. Modification 2

Figure 7:
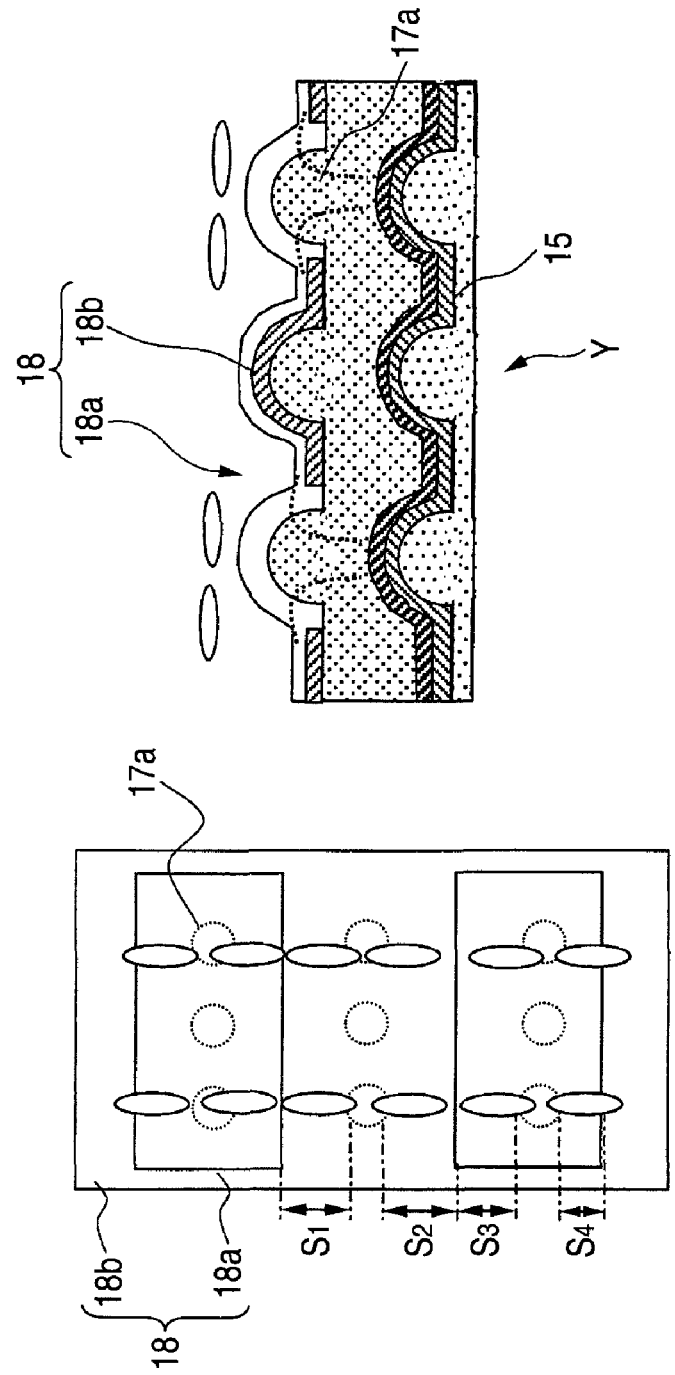
FIG. 7 shows a cross section depicting the essential part of a liquid crystal display device according to a modification 2 of the first embodiment of an embodiment of the invention.

Moreover, as shown in an enlarged diagram depicting the essential part of a reflective display area Y (when an electric field is applied) in FIG. 7, the configuration of arranging the pixel electrode 18 in the first embodiment and the configuration of arranging the pixel electrode 18 in a second embodiment may be mixed. In this case, projecting patterns 17a of a second interlayer insulating film 17 are partially covered with an electrode part 18b of a pixel electrode 18, and a slit 18a of the pixel electrode 18 is arranged on the other projecting patterns 17a.

In this case, preferably, the electrode parts 18b of the pixel electrode 18 are arranged so that distances $S_1$ and $S_2$ between the end part of the projecting pattern 17a arranged right under the electrode part 18b and both end parts of the electrode part 18b of the pixel electrode 18 are greater than the length of the major axis of the liquid crystal molecule m as well as distances $S_3$ and $S_4$ between the end part of the projecting pattern 17a and the end parts of the electrode part 18b become equal.

Even in the liquid crystal display device, as similar to the first embodiment, since variations in the distances between the end parts of the electrode part 18b and the common electrode 15 in the reflective display area Y are suppressed, and drive voltage can be reduced as well as the contrast can be improved.

4. Modification 3

Figure 8:
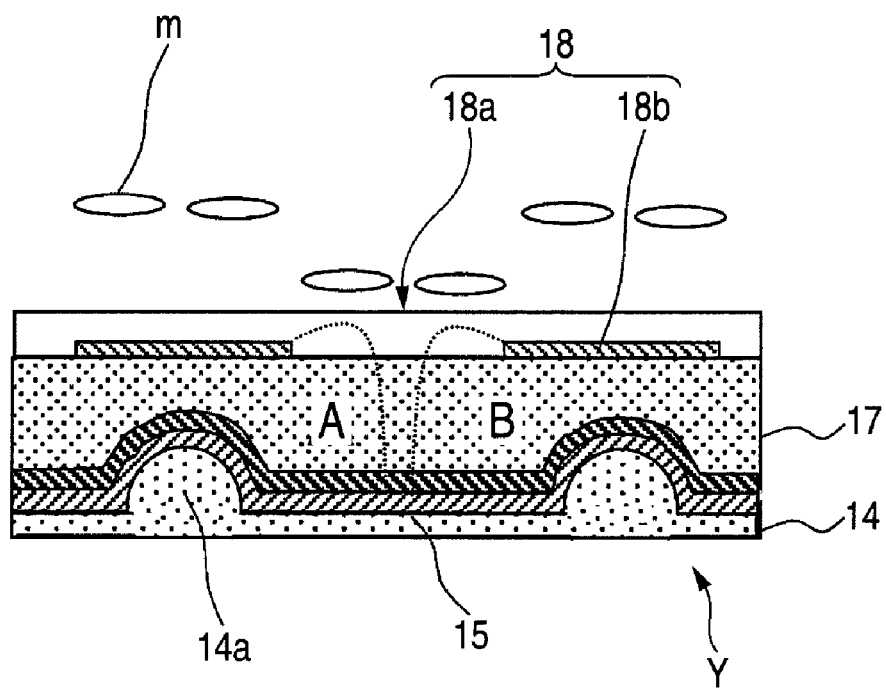
FIG. 8 shows a cross section depicting the essential part of a liquid crystal display device according to a modification 3 of the first embodiment of an embodiment of the invention.

In addition, as shown in an enlarged diagram depicting the essential part of a reflective display area Y (when an electric field is applied) in FIG. 8, the front surface of a second interlayer insulating film 17 on which a pixel electrode 18 is provided may be planarized by Chemical Mechanical Polishing (CMP), for example.

Here, preferably, an electrode part 18b of the pixel electrode 18 or a slit 18a is provided on projecting patterns 14a of the scattering film 14, whereby variations in the distances between the end parts of the electrode part 18b and the common electrode 15 in the reflective display area Y are suppressed. Particularly, in the case in which the electrode part 18b is provided on the projecting patterns 14a, the projecting pattern 14a are not arranged below the slit 18a, and an electric field is generated between the end parts of the electrode part 18b of the pixel electrode 18 and the flat surface of the common electrode 15. Thus, it is preferable that since the electric field intensity in the reflective display area Y is defined with no influence of the projecting pattern 14a, the electric field intensities in the transmissive display area X and the reflective display area Y can be matched.

Even in the liquid crystal display device, as similar to the first embodiment, since variations in the distances between the end parts of the electrode part 18b and the common electrode 15 in the reflective display area Y are suppressed, and drive voltage can be reduced as well as the contrast can be improved.

In addition, in accordance with the liquid crystal display device according to the embodiment, the second interlayer insulating film 17 is planarized to flatten the pixel electrode 18 formed there on and the front surface of the alignment layer 19. Therefore, orientation control over the liquid crystal molecules m can be conducted with no influence of the projecting patterns 14a of the scattering film 14.

5. Second Embodiment

Figure 9A:
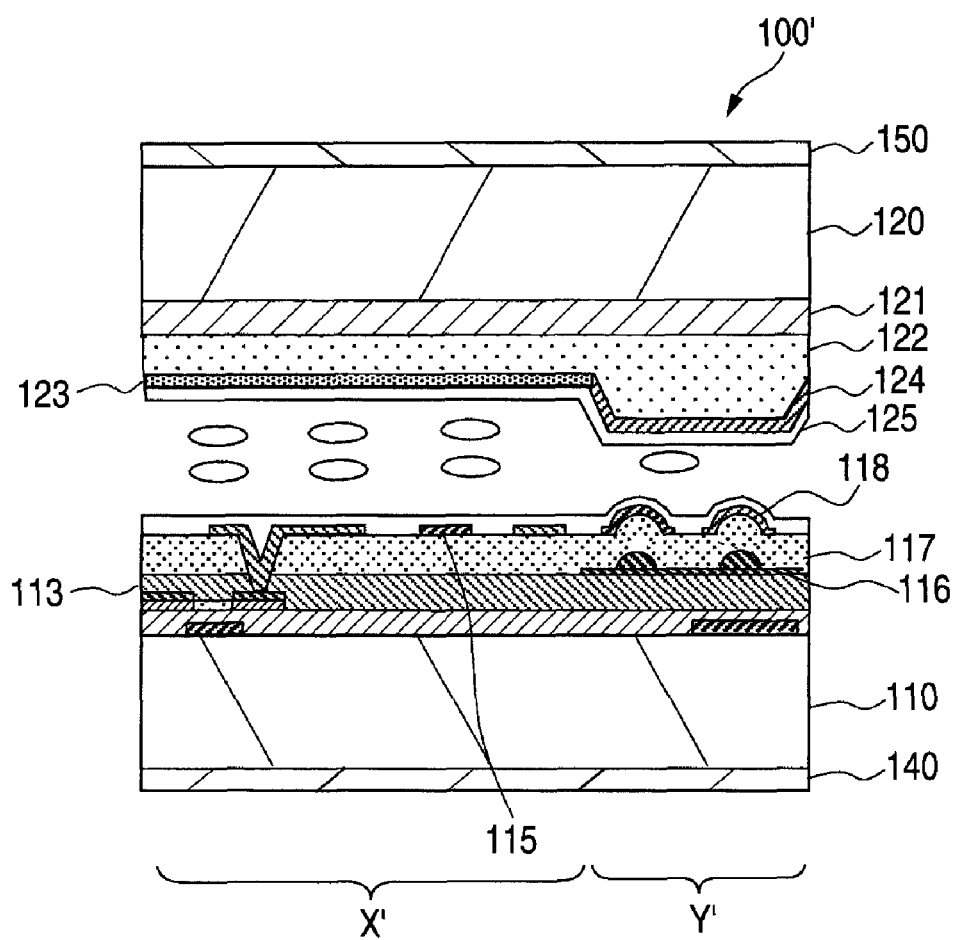
FIG. 9A shows a cross section depicting the configuration of a liquid crystal display device according to a second embodiment of an embodiment of the invention and FIG. 9B shows a plan view depicting the same.
Figure 9B:
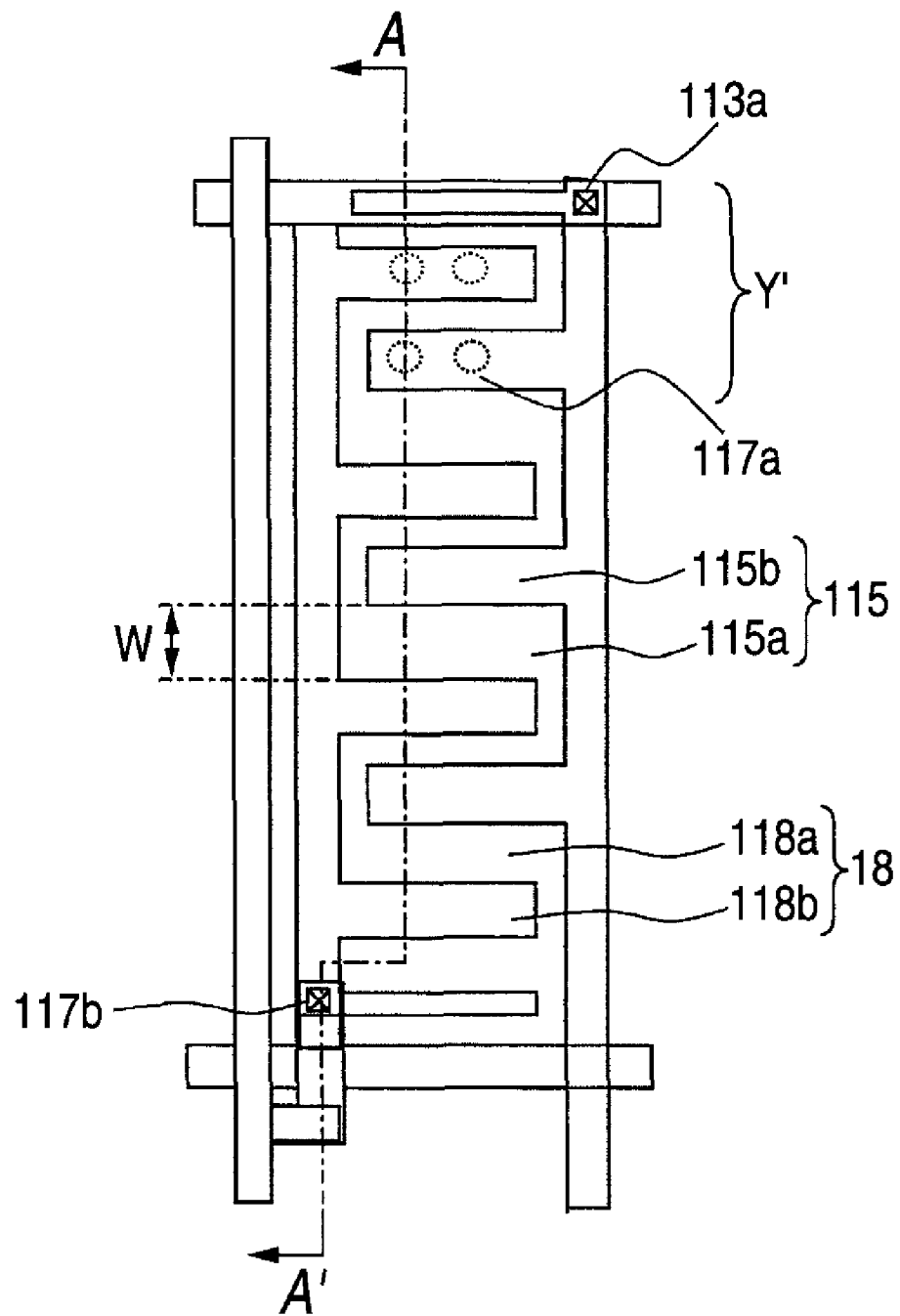

In the first embodiment described above, the example of the FFS mode liquid crystal display device is used and described. In this embodiment, an example of an IPS mode liquid crystal display device will be described with reference to FIGS. 9A and 9B.

As shown in the drawing, an IPS mode liquid crystal display device 100' has a liquid crystal panel formed of a first substrate 110, a second substrate 120 that is provided on the device forming surface side of the first substrate 110 as facing thereto, and a liquid crystal layer 130 sandwiched between the first substrate 110 and the second substrate 120. Here, it is supposed that the liquid crystal layer 130 is configured of nematic liquid crystal molecules. In addition, in the liquid crystal panel, on the outer surfaces of the first substrate 110 and the second substrate 120, the polarizers 140 and 150 are bonded thereto, respectively, through an adhesive (not shown). It is supposed that these polarizers 140 and 150 are arranged in crossed nicols. In addition, on the outer side of the polarizer 140 on the first substrate 110 side, a backlight (not shown) is provided that is a light source for transmissive display.

Moreover, in the liquid crystal display device 100', the configuration of the layers to the first interlayer insulating film 113 provided on the first substrate 110 is the same as the configuration of the layers to the first interlayer insulating film 13 discussed in the first embodiment (see FIG. 1A), omitting the descriptions.

On the first interlayer insulating film 113 in a reflective display area Y', a reflective film 116 is provided that has projecting patterns 116a on the front surface side. Then, on the first interlayer insulating film 113, a second interlayer insulating film 117 is provided as it covers the reflective film 116. On the front surface side of the second interlayer insulating film 117 in the reflective display area Y', projecting patterns 117a are provided as similar to the surface topology of the reflective film 116. Moreover, an example will be described in which the projecting patterns 116a are provided on the front surface side of the reflective film 116 itself, but such a configuration may be possible in which a scattering film formed of an insulating film is provided that has projecting patterns on the front surface side below the reflective film 116 and the projecting patterns 116a of the reflective film 116 are provided as similar to the surface topology of the scattering film.

In the second interlayer insulating film 117 and the first interlayer insulating film 113, a contact hole 117b reaching a drain electrode 112b is provided, and on the second interlayer insulating film 117, a comb teeth pixel electrode 118 is provided that has a plurality of slits 118a as it is connected to the drain electrode 112b through the contact hole 117b.

In addition, on the second interlayer insulating film 117, a comb teeth common electrode 115 having a slit 115a is provided, and the common electrode 115 is connected to a common line 111 through a contact hole 113a. In addition, an electrode strip 118b of the pixel electrode 118 and an electrode strip 115b of the common electrode 115 are alternately arranged. Therefore, an electric field is applied between the electrode strip 118b of the pixel electrode 118 and the electrode strip 115b of the common electrode 115 in the lateral direction almost in parallel to the substrate surface with respect to the liquid crystal layer 130. Then, on the second interlayer insulating film 117, an alignment layer 119 is provided as it covers the pixel electrode 118 and the common electrode 115.

Here, in the embodiment, for example, the projecting patterns 117a of the second interlayer insulating film 117 are lined up directly under the electrode strip 118b of the pixel electrode 118 or directly under the electrode strip 115b of the common electrode 115 along the longitudinal direction of the slit 118a or the slit 115a. In other words, the electrode strip 118b of the pixel electrode 118 and the electrode strip 115b of the common electrode 115 are provided as they cover the projecting patterns 117a of the second interlayer insulating film 117. In this case, the end parts of the electrode strip 118b or the electrode strip 115b are arranged on the flat surface of the second interlayer insulating film 117 to equal a spacing W between the electrode strip 118b and the electrode strip 115b.

Here, the electric field intensity of the IPS mode liquid crystal display device is defined in accordance with the spacing W between the electrode strip 118b and the electrode strip 115b. In the embodiment, since the spacings W between the electrode strips 118b and the electrode strips 115b are equal as well as the projecting patterns 116a are not provided between the electrode strip 118b and the electrode strip 115b, the electric field intensities in the reflective display area Y' can be made equal with no influence of the projecting pattern 116a. Accordingly, fluctuations in the electric field intensity in the reflective display area Y' can be suppressed, and drive voltage is decreased. In addition, the spacings W between the electrode strips 118b and the electrode strips 115b in a transmissive display area X' are matched with each other as well, whereby the electric field intensities in the pixel can be made equal.

In addition, in the IPS mode liquid crystal display device, since liquid crystal molecules m on the electrode strip 118b and on the electrode strip 115b are not aligned, orientation control over the liquid crystal molecules m can be conducted only on the flat surface. Therefore, since the liquid crystal molecules m are suppressed from tilting to the substrate surface, the contrast can be improved.

On the other hand, the second substrate 120 is formed of a transparent substrate such as a glass substrate, and on the surface of the second substrate 120 facing the liquid crystal layer 130, RGB color filters 121 and a flattened film 122 are provided, the flattened film 122 that controls the cell gaps of the transmissive display area X' and the reflective display area Y'. The flattened layer 122 controls the cell gap of the reflective display area Y' to be a half of the cell gap of the transmissive display area X'. In addition, a non-phase difference layer 123 is provided on the surface of the flattened film 122 facing the liquid crystal layer 130 in the transmissive display area X', and a phase difference layer 124 is provided on the surface of the flattened film 122 facing the liquid crystal layer 130 in the reflective display area Y'. The phase difference layer 124 functions as a λ/4 layer. Moreover, on the surfaces of the non-phase difference layer 123 and the phase difference layer 124 facing the liquid crystal layer 130, an alignment layer 125 is provided.

Moreover, the circuit pattern of the IPS mode liquid crystal display device 100' is the same as the circuit pattern discussed with reference to FIG. 4 in the first embodiment, and the orientation of the liquid crystal molecules m is similarly conducted depending on the application and non-application of an electric field.

Even in the liquid crystal display device and the liquid crystal display apparatus having the same, since the spacings W between the electrode strips 118b and 115b of the pixel electrode 118 and the common electrode 115 can be made equal in the reflective display area Y' as the projecting patterns 116a are provided on the front surface side of the reflective film 116, drive voltage can be decreased. In addition, since the spacings W between the electrode strips 118b and 115b are made equal to facilitate the application of an electric field in the lateral direction in parallel to the substrate surface, the contrast can be improved. Therefore, higher efficiency and higher image quality can be intended in a liquid crystal display apparatus.

Moreover, in accordance with the liquid crystal display apparatus according to the embodiment, since the projecting patterns 117a do not block the area between the pixel electrode 118 and the common electrode 115, the electric field intensity can be prevented from receiving the influence of the projecting patterns 116a.

6. Modification 4

Figure 10A:
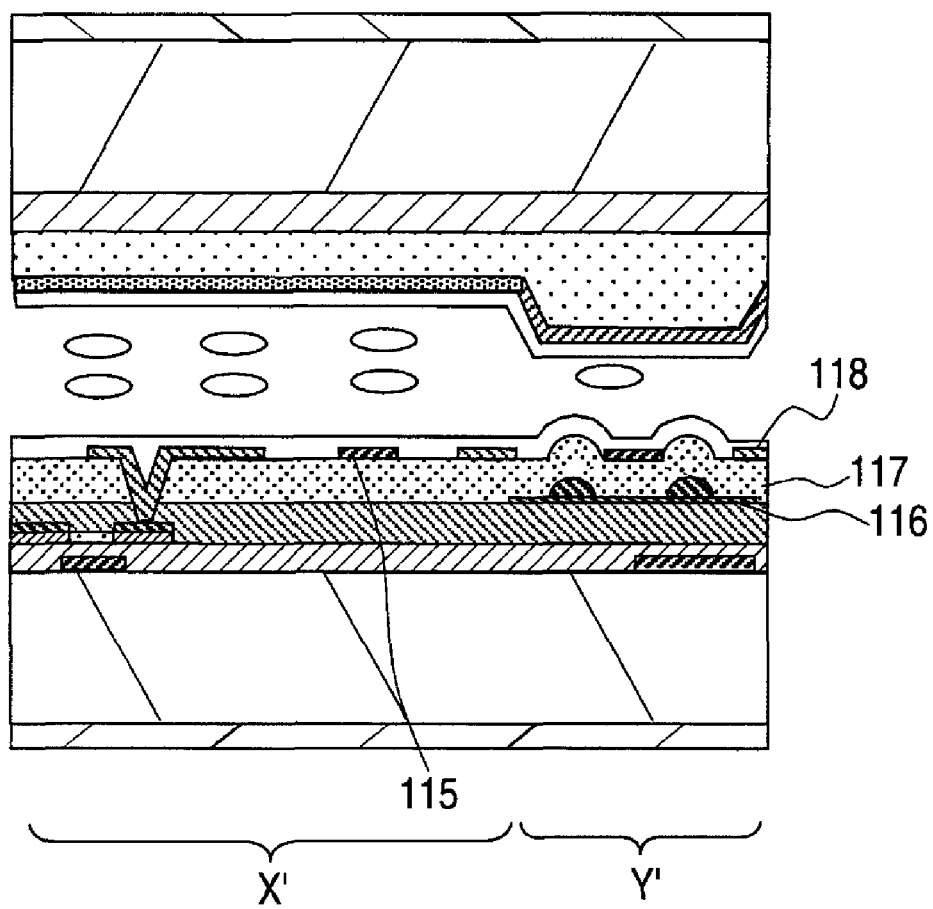
FIG. 10A shows a cross section depicting a liquid crystal display device according to a modification 4 of the second embodiment of an embodiment of the invention and FIG. 10B shows a plan view depicting the same.
Figure 10B:
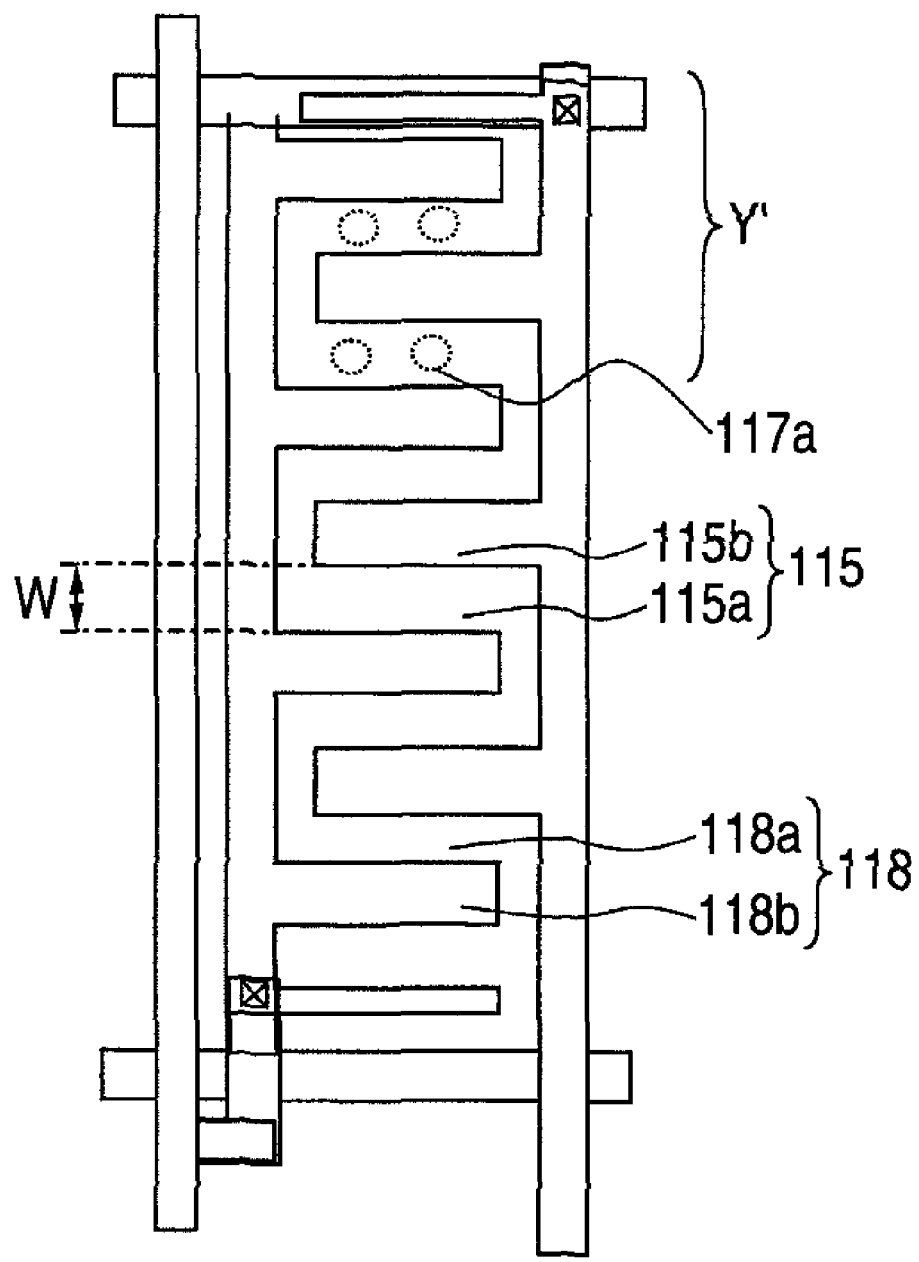
Figure 11:
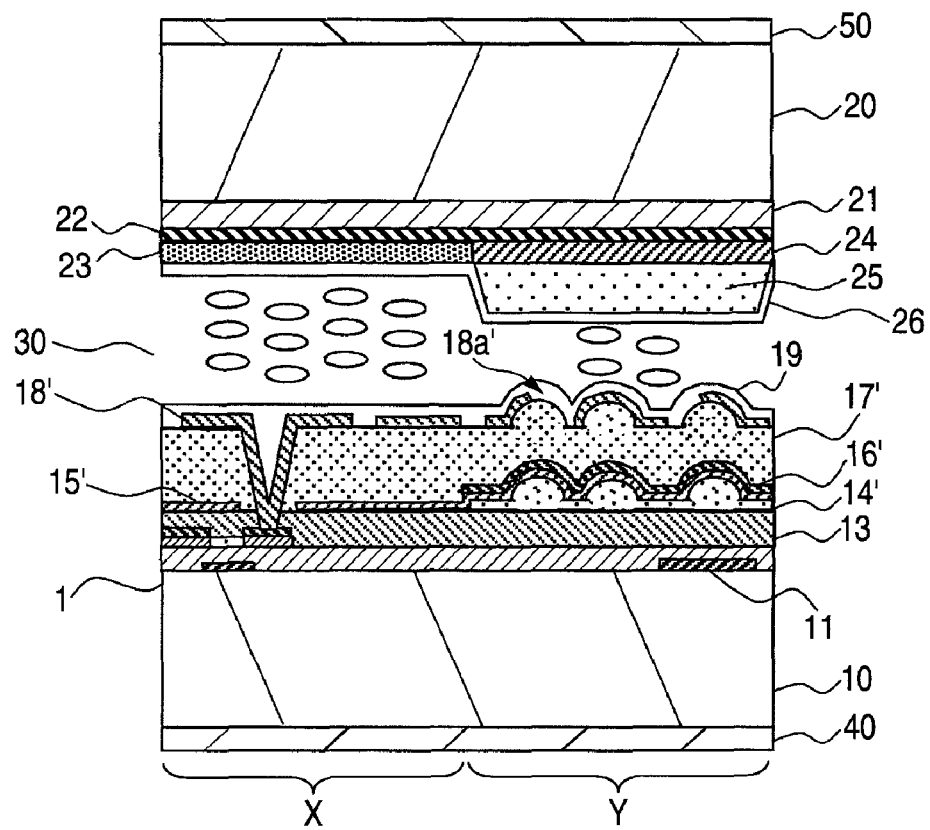
FIG. 11 shows a cross section illustrative of the configuration of a liquid crystal display device before.
Figure 12:
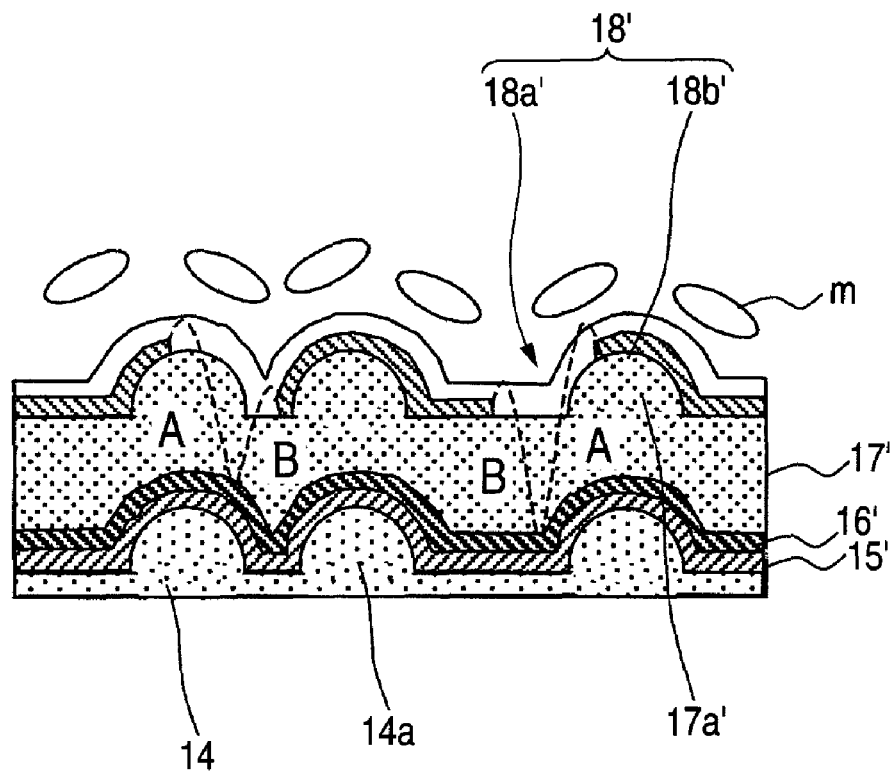
FIG. 12 shows a cross section depicting the essential part showing the problems of the liquid crystal display device before.

Moreover, in the second embodiment described above, the example is described in which the electrode strip 118b or 115b of the pixel electrode 118 or the common electrode 115 is provided to cover the projecting patterns 117a of the second interlayer insulating film 117, but an embodiment of the invention is not restricted thereto. As shown in FIGS. 10A and 10B, the projecting patterns 117a may be provided between the electrode strips 118b and 115b of the pixel electrode 118 and the common electrode 115.

Even in the liquid crystal display device and the liquid crystal display apparatus having the same, since the spacings W between the electrode strips 118b and 115b of the pixel electrode 118 and the common electrode 115 can be made equal as the projecting patterns 116a are provided on the front surface side of the reflective film 116, drive voltage can be decreased as well as the contrast can be improved, and higher efficiency and higher image quality can be intended in a liquid crystal display apparatus.

In addition, although not shown in the drawing, as in the modification 3 of the first embodiment, the configuration of the planarized second interlayer insulating film 117 can be adapted to the second embodiment.

Moreover, in the embodiments and the modifications, the example of the transreflective liquid crystal display device is taken and discussed, but an embodiment of the invention is not restricted thereto, which may be also adapted to a fully reflective liquid crystal display apparatus of the FFS mode or IPS mode.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:

a liquid crystal layer sandwiched between a first substrate and a second substrate;

a reflective display area including, between said first and second substrates, (1) a common electrode and (2) a pixel electrode having a plurality of slits so as to apply an electric field to the liquid crystal layer; and between the first substrate and the pixel electrode, an interlayer insulating film and a reflective film in this order proceeding from the pixel electrode, wherein, said common electrode, said pixel electrode, said reflective film and said interlayer insulating film have substantially identical projecting patterns in registry with each other on front surface sides facing said second substrate, said pixel electrode conforms to the shape of a surface of the interlayer insulating film facing the second substrate;

said slits and said projecting patterns extend along parallel lines, said slits are positioned between lines of said projection patterns, flat surfaces exist on said interlayer insulating film between said lines of projection patterns, said common electrode has flat portions between its lines of projection portions, and the pixel electrode and the common electrode are arranged so that electric field intensities between the pixel electrode and the common electrode are uniform in the reflective display area.

2. The liquid crystal display device according to claim 1, wherein the liquid crystal display device is a fringe field switching mode liquid crystal display device in which the common electrode is arranged more on the first substrate side than the pixel electrode.

3. The liquid crystal display device according to claim 1, wherein the pixel electrode includes edge portions, each edge portion being equal to or greater than a length of a major axis of a liquid crystal molecule.

4. The liquid crystal display device according to claim 2, wherein the interlayer insulating film is provided on the front surface side to have projecting patterns as similar to a surface topology of the reflective film, and the pixel electrode is provided so that a projecting pattern of the interlayer insulating film is arranged inside a slit.

5. The liquid crystal display device according to claim 1, wherein:

said slits of said pixel electrode are defined in part by edge portions which extend flatly from edges of said projection portions, and all edges of said slits between the projection patterns of the pixel electrode extend evenly onto said flat surfaces between said projection patterns.

* * * * *